William Linton's Improved Filter
116463
PATENTED JUN 27 1871
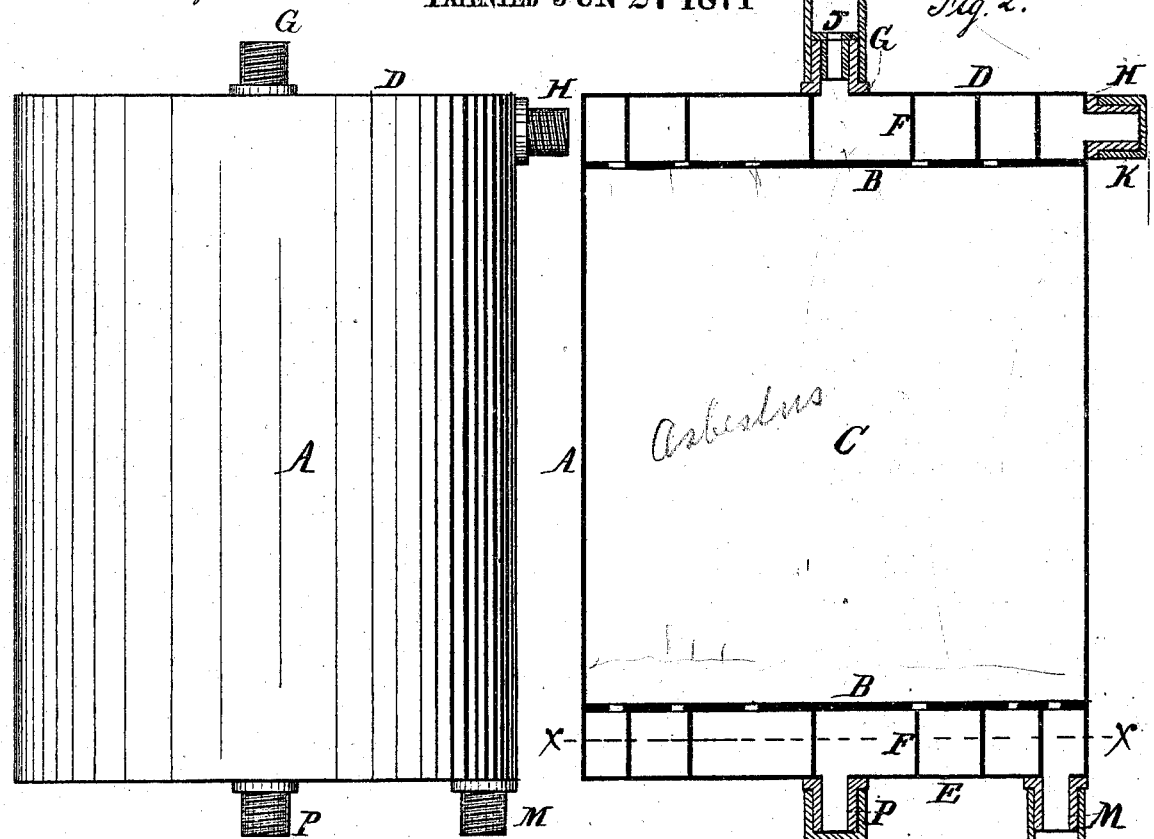
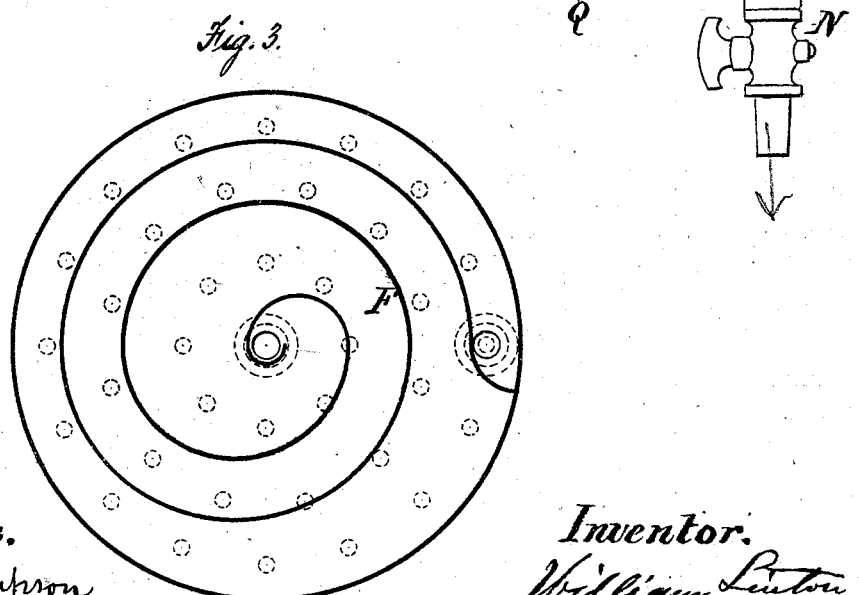
Witnesses.
Thomas P. Simpson
Amos W. Hart
Inventor.
William Linton

116,463

UNITED STATES PATENT OFFICE.

WILLIAM LINTON, OF BALTIMORE, MARYLAND.

IMPROVEMENT IN FILTERS.

Specification forming part of Letters Patent No. 116,463, dated June 27, 1871.

*To all whom it may concern:*

Be it known that I, WILLIAM LINTON, of Baltimore city and county, in the State of Maryland, have invented certain new and useful Improvements in Water-Filters; and I hereby declare the following to be a full and exact description thereof, reference being had to the accompanying drawing forming a part of this specification.

This invention relates to improvement in filters for water; and consists in the filter constructed as hereinafter described, and composed of a case provided with perforated diaphragms or partitions near each end, forming a large chamber between them for reception of the filtering material, and provided with vertical scrolls for conducting or guiding the water between said diaphragms and the heads of the filter, and with tubes or nozzles for allowing a reversed current to be passed through the filter, as hereinafter fully set forth.

In the drawing, Figure 1 represents a side elevation of my improved filter; Fig. 2, a central vertical section of the same; and Fig. 3, of one of its ends, and the scroll and diaphragm connected therewith.

The cylinder or case A is provided with perforated partitions or diaphragms B B, arranged parallel to and a short distance from the heads D and E, respectively, leaving the large chamber C between them for the reception of asbestus, which I have found the most preferable material for removing feculent matter from water, since it is well-nigh indestructible, and acts on the water otherwise than in a merely mechanical manner, as in the case of most or all other filtering substances. Between the aforesaid heads and partitions I arrange vertical scrolls F, and fasten them to those parts in any approved way; thereby I strengthen the heads, and form a long passage for the water entering through nozzle G, so that it will be spread evenly over the surface of the adjacent partitions, and distributed in like manner to the asbestus, so as to be thoroughly filtered. The nozzle G may be provided with bushings J to regulate or graduate the supply of water entering the cylinder through the pipe I. The water is drawn from the cylinder by the cock N, which is screwed on the nozzle M. H and P indicate nozzles closed by caps K and Q, respectively.

When this filterer becomes foul or filled with an accumulation of feculent matter the caps K and Q may be removed and the filterer unscrewed from the pipe I, the cap Q taken from the nozzle P and screwed onto M, or the cock N turned so as to prevent the escape of the water, and the cap K removed from H and applied to G, when the nozzle P must be screwed into the pipe I, and the water run in at P and out at H to clean the filterer, by carrying out the accumulated collection of feculent matter and leaving the filterer comparatively clean, when it may be unscrewed from the pipe and the caps put back, as first described, and the nozzle G applied to the pipe I as before, when it will be ready for use again. I contemplate that my improvement in filterers may be used to advantage in filtering saccharine solution and sirups in refining sugar, and rectifying liquors, and many other purposes.

What I claim as my invention and improvement in filters is—

The improved filter formed of the cylindrical case A, heads D E, perforated horizontal partitions B B, vertical scrolls F F, chamber C for filtering material, nozzles G and M, cock N, nozzles H and P, and caps K Q, all constructed and arranged as shown and described.

WM. LINTON.

Witnesses:
W. E. EDMONDS,
THOS. B. BARNARD.